US007976152B2

(12) United States Patent
Kondo

(10) Patent No.: US 7,976,152 B2
(45) Date of Patent: Jul. 12, 2011

(54) IMAGE RECORDING APPARATUS

(75) Inventor: Etsuyasu Kondo, Tokyo (JP)

(73) Assignee: Olympus Corporation, Tokyo (JP)

( * ) Notice: Subject to any disclaimer, the term of this patent is extended or adjusted under 35 U.S.C. 154(b) by 964 days.

(21) Appl. No.: 11/903,163

(22) Filed: Sep. 20, 2007

(65) Prior Publication Data

US 2008/0074447 A1 Mar. 27, 2008

(30) Foreign Application Priority Data

Sep. 21, 2006 (JP) ................................ 2006-256096

(51) Int. Cl.
*B41J 2/01* (2006.01)
*G01D 15/00* (2006.01)

(52) U.S. Cl. ........ 347/104; 346/103; 346/138; 101/106; 101/110

(58) Field of Classification Search .................. 347/101, 347/104, 105; 346/103, 136, 138; 399/123; 101/99, 106, 110

See application file for complete search history.

(56) References Cited

U.S. PATENT DOCUMENTS 3,750,624 A * 8/1973 Sato et al. .................... 399/242
4,029,009 A * 6/1977 Kuhn et al. .................. 101/231
5,740,510 A * 4/1998 Van den Bogaert et al. .. 399/298
6,199,614 B1 * 3/2001 Snyder et al. ................ 156/387
6,945,631 B2 * 9/2005 Adachi .......................... 347/55

FOREIGN PATENT DOCUMENTS

JP 2003-063707 A 3/2003

* cited by examiner

*Primary Examiner* — Daniel Petkovsek
(74) *Attorney, Agent, or Firm* — Holtz, Holtz, Goodman & Chick, PC

(57) ABSTRACT

An image recording apparatus comprises a plurality of drums for holding a recording medium on their perimeter faces and for being able to rotate the recording medium, and printing unit, which are arranged as opposed to the perimeter faces of the drums, for being able to make printing on the recording medium. A tension generating unit for applying a tension to the recording medium is arranged in the upstream and the downstream of the drums on the conveyance path of the recording medium. A drum in the downmost stream side of the conveyance path is used as a driving drum, and the other drums are used as driven drums.

8 Claims, 5 Drawing Sheets

IMAGE RECORDING APPARATUS

CROSS REFERENCE TO RELATED APPLICATIONS

This application is based upon and claims the benefit of priority from the prior Japanese Patent Application No. 2006-256096, filed Sep. 21, 2006, the entire contents of which are incorporated herein by reference.

BACKGROUND OF THE INVENTION

1. Field of the Invention

The present invention relates to an image recording apparatus that comprises a plurality of printing units and a plurality of drums, and makes image recording.

2. Description of the Related Art

For example, an inkjet printer that makes high-speed image recording of high quality on a recording medium, which is held and conveyed by a conveyance mechanism, by emitting ink droplets from a plurality of nozzles is cited as an image recording apparatus.

This inkjet printer is widely used as a printer for office use, which records an image, for example, on a cut-sheet recoding medium (paper). Additionally, the throughput of an inkjet printer has been improved in recent years by configuring a line head where many printing heads are aligned and arranged in a direction orthogonal to the conveyance direction of a recording medium. An inkjet printer is also used as a printer for industrial use, which records an image on a recording medium (continuous paper) such as roll paper, etc.

A rotational drum that holds and conveys continuous paper such as roll paper, etc. by winding the paper around its perimeter face can be cited as one of effective means for holding and conveying continuous paper in such an image recording apparatus.

Patent Document (Japanese Published Unexamined Patent Application No. 2003-63707) discloses the invention related to the configuration of an image recording apparatus that conveys continuous paper with the above described drum, and can make double-sided printing. The conveyance mechanism of the above described patent document is configured with first and second drums for holding a recording medium by winding the medium around their perimeter faces, a paper conveying unit that is arranged on the upstream side of the conveyance path of the recording medium and on the upstream side of the first drum, and a paper puller unit that is arranged on the downstream side of the conveyance path of the recording medium and on the downstream side of the second drum.

The paper conveying unit and the paper puller unit are composed of conveying rollers made of stainless steel, and driven rollers made of rubber, which are pressed against the conveying roller via a recording medium. A motor is connected to each of the conveying rollers. The conveyance speed of the paper puller unit, which is arranged on the downstream side of the conveyance path, is positively set to become faster than the conveyance speed of the paper conveying unit, which is arranged on the upstream side of the conveyance path. Additionally, the conveying force of the paper puller unit is set to a value smaller than that of the paper conveying unit, so that the conveying rollers of the paper puller unit and the recording medium always slide. With this configuration, the recording medium does not become loose on the first and the second drums, and can be conveyed in close contact with the perimeter face.

Additionally, a first position detecting unit for outputting an accurate electric pulse in accordance with the rotational amount of the first drum is attached to the first drum. A first printing unit arranged at the perimeter of the first drum emits an ink to the recording medium in synchronization with the electric pulse output from the first position detecting unit. Similarly, a second position detecting unit for outputting an accurate electric pulse in accordance with the rotational amount of the second drum is attached to the second drum. A second printing unit arranged at the perimeter of the second drum emits an ink to the back side of the recording medium, which is recorded by the first printing unit, in synchronization with the electric pulse output from the second position detecting unit. As described above, the image recording apparatus conveys the recording medium with the paper conveying unit and the paper puller unit, and can make double-sided printing.

SUMMARY OF THE INVENTION

An image recording apparatus in a principal aspect of the present invention comprises a plurality of drums for holding a recording medium on their perimeter faces and for being able to rotate the recording medium, and printing unit, which are arranged as opposed to the perimeter faces of the plurality of drums, for being able to make printing on the recording medium, wherein tension generating unit for applying a tension to the recording medium is arranged in the upstream and the downstream of the plurality of drums on the conveyance path of the recording medium, a drum on the downmost stream side on the conveyance path is used as a driving drum, and the other drums are used as driven drums.

DESCRIPTION OF THE PREFERRED EMBODIMENTS

A first preferred embodiment according to the present invention is described with reference to FIGS. 1 to 3.

Figure 1:
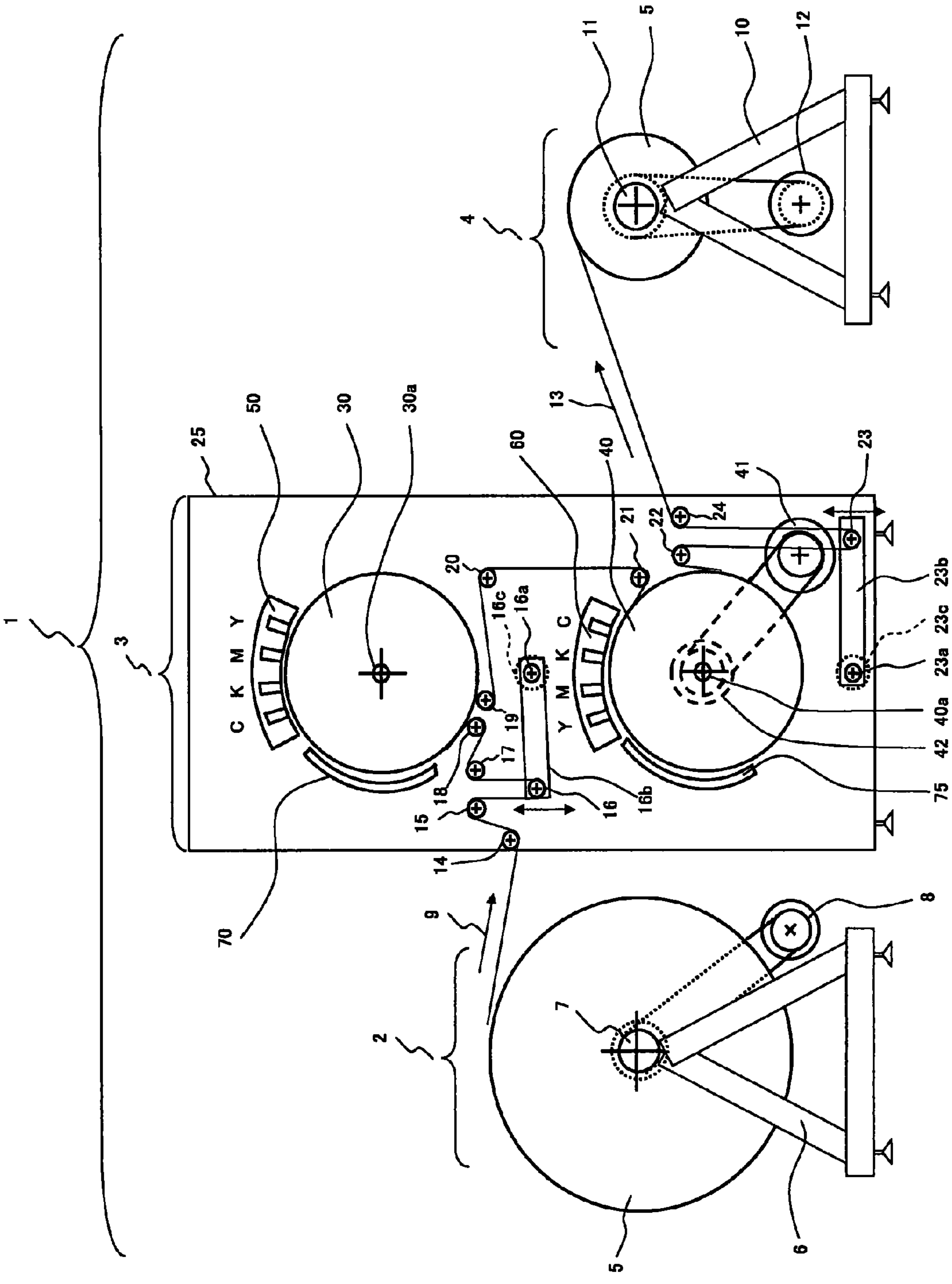
FIG. 1 is a schematic front view showing a conveying system of a recording medium in an image recording apparatus according to a first preferred embodiment.

FIG. 1 is a schematic front view showing a conveying system of a recording medium 5 in an image recording apparatus 1 according to a preferred embodiment. FIG. 2 is a schematic side view showing the printer unit 3 of the image recording apparatus 1 according to this preferred embodiment. FIG. 3 is a schematic front view showing a first maintenance unit and a first printing unit 50 arranged as opposed to a first drum. The image recording apparatus 1 according to this preferred embodiment comprises an unwinder unit 2, a printer unit 3, and a rewinder unit 4.

The unwinder unit 2 is described first.

This unwinder unit 2 comprises a stand 6, and a paper core fixing shaft 7.

The unwinder unit 2 is an unwinding unit for holding the recording medium 5 to be rotatable, and for unwinding the recording medium 5 to the printer unit 3. In this preferred embodiment, roll paper is used as the recording medium in the unwinder unit 2. The size of roll paper that can be loaded in the unwinder unit 2 is, for example, roll paper having a width of 318 mm (12.5 inches), a roll diameter of 0.7 m, and a mass of approximately 110 kg.

The stand 6 supports the paper core fixing shaft 7 to be rotatable. Air is injected into an air inlet not shown in the paper core fixing shaft 7, so that a plurality of nails, which are intended to chuck the inner diameter of a paper core, protrude in a radius direction. As a result, the nails of the paper core fixing shaft 7 bite into the inner diameter of the paper core of the recording medium 5, which is thus held.

A driving motor 8 for unwinding is connected to the paper core fixing shaft 7 via a pulley and a belt. A driving force of the driving motor 8 is transferred to the paper core fixing shaft 7, and the recording medium 5 is unwound in the direction of an arrow 9. Additionally, a powder clutch not shown is arranged between the pulley and the driving motor. The powder clutch functions to apply a tension in a reverse direction to the conveyance direction of the recording medium 5.

The printer unit 3 is described next. The printer unit 3 loads the recording medium 5 conveyed from the unwinder unit 2, and holds the recording medium 5 by winding the medium around a first drum 30. Then, the recording medium 5 is conveyed immediately below a first printing unit 50 that is arranged as opposed to the first drum 30, and printing is made on the surface of the recording medium 5. The recording medium 5 is held by being wound around a second drum 40 after its surface is printed. Then, the recording medium 5 is conveyed immediately below a second printing unit 60 that is arranged as opposed to the second drum 40, printing is made on the back side of the recording medium 5, and the recording medium 5 is fed to the rewinder unit 5.

Figure 2:
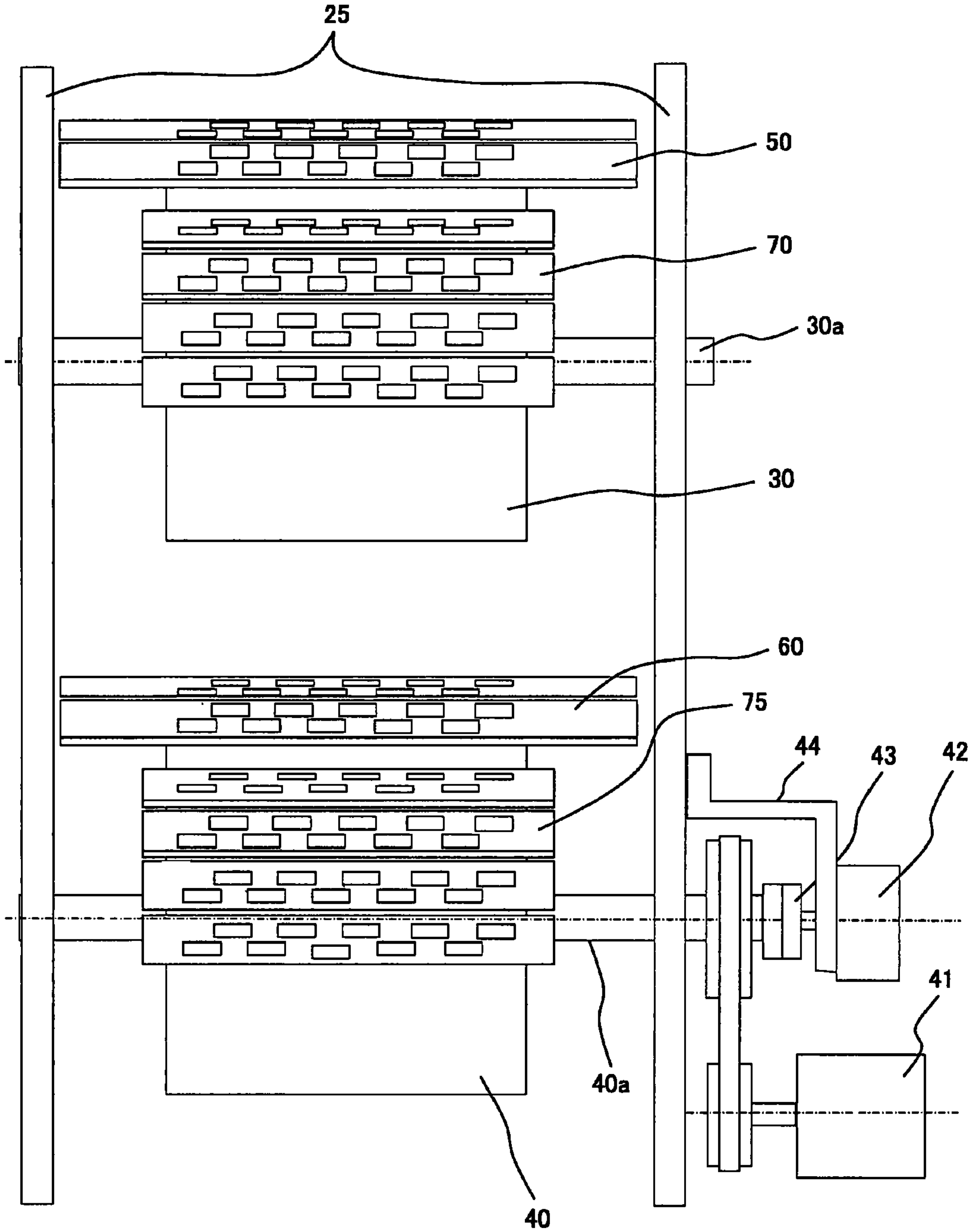
FIG. 2 is a schematic side view showing a printer unit of the image recording apparatus according to the first preferred embodiment.

The printer unit 3 is configured with a conveying unit of the recording medium 5, which is composed of a plurality of rollers, the first drum 30 and the second drum 40, a body frame 25, the first printing unit 50, the second printing unit 60, a first maintenance unit 70, and a second maintenance unit 75, such as FIG. 1 and FIG. 2.

The conveying unit of the recording medium 5 is described first. The recording medium 5 unwound from the unwinder unit 2 is conveyed to the first drum 30 via free rollers 14 and 15, a first dancer roller 16, and free rollers 17 and 18.

The first dancer roller 16 is held to be rotatable at the tip of an arm 16*b* having its turn center 16*a* in the body frame 25. The self-weights of the first dancer roller 16 and the arm 16*b* configure a tension generating unit for applying a tension to the recording medium 5 that is wound around the first dancer roller 16.

The tension generating unit also functions to remove looseness if the recording medium 5 gets loose due to fluctuations in the tension, which are caused by the lopsided core, etc. of the recording medium 5 that is held by the unwinder unit 2. Additionally, a potention meter 16*c* for detecting a rotational position when the first dancer roller 16 moves in the vertical direction is provided at the turn center 16*a*. The tension of the recording medium 5 is controlled by activating the powder clutch, which is linked to the paper core fixing shaft 7 of the unwinder unit 2, in accordance with the output signal of the potention meter 16*c*. The free rollers 14, 15, 17 and 18 are supported by the body frame 25 to be rotatable.

A configuration of the first drum 30 is described next. The first drum 30 is a hollow cylinder made of, for example, aluminum. A rotational shaft 30*a* of the first drum 30 is supported by the body frame 25 to be rotatable. Additionally, one end of a member that supports the first printing unit 50 to be described later, and one end of a member that supports the first maintenance unit 70 to be described later are engaged with the rotational shaft 30*a*. The recording medium 5 is wound around the first drum 30 according to this preferred embodiment at a winding angle of 330 degrees.

The winding angle of 330 degrees of the recording medium 5 in the first drum 30 according to this preferred embodiment is set as follows. Assume that a tension on the winding side of the first drum 30, a tension on the unwinding side, a static friction coefficient between the first drum 30 and the recording medium 5, and a winding angle are T2, T1, $\mu$ and $\theta$ respectively. In this case, numeric values are set so that relationships of $T2/T1 \leqq \exp(\mu\theta)$, and $T2/T1 \geqq 1/\exp(\mu\theta)$ are satisfied. Namely, $\theta$ is set to 330 degrees considering that the first drum 30 and the recording medium 5 do not slide even if the recording medium 5 has the static friction coefficient $\mu$ with the first drum 30 of 0.07 when T1 and T2 are 35N and 50N respectively. Additionally, the first drum 30 and the recording medium 5 do not slide by setting the winding angle $\theta$ to 180 degrees or more even if the recording medium 5 has the static friction coefficient $\mu$ with the first drum 30 of 0.12 when T1 and T2 are 35N and 50N respectively. Since the static friction coefficient $\mu$ of normal paper is a value that is sufficiently larger than 0.12, most paper types and the first drum 3 do not slide by setting the winding angle $\theta$ to 180 degrees or more. Similar settings are made also for the second drum 40.

The winding angle of the recording medium 5 in the first drum 30 is secured as broad as 330 degrees as in this preferred embodiment in this way, whereby the recording medium 5 applies normal force to the perimeter face of the first drum 30 with a tension at the beginning of winding made by the first dancer roller 16 of the first drum 30, and that at the end of winding made by the second dancer roller 23. As a result, the friction force between the first drum 30 and the recording medium 5 increases, so that the first drum 30 and the recording medium 5 do not slide and the recording medium 5 can be held in close contact with the first drum 30. Accordingly, accurate paper conveyance, and a control for the number of rotations of the drum can be made.

Furthermore, the surface of the recoding medium 5, which is wound around the first drum 30, is a surface the size accuracy of which is stably high, and is an area as wide as 330 degrees. Therefore, many printing units can be arranged in a circumferential direction of the first drum 30 in order to increase the resolution of an image recorded on the recording medium 5, and stable detection, which is made by a printing quality detecting device for detecting the quality of printing after the printing, can be made. Besides, there are advantages such that a UV hardening lamp, which is required for a UV ink, etc., can be arranged, and UV irradiation can be made under a stable hardening condition.

With the above described configuration, the first drum 30 serves as a rotating drum driven by the second drum 40 via the recording medium 5.

After being wound around the first drum 30, the recording medium 5 is conveyed to the second drum 40 via free rollers 19, 20 and 21. Also these free rollers 19, 20 and 21 are supported by the body frame 25 to be rotatable.

A configuration of the second drum 40 is described next. Also the second drum 40 is a hollow cylinder made of, for example, aluminum similar to the first drum 30. A rotational shaft 40*a* of the second drum 40 is supported by the body frame 25. Additionally, one end of a member that supports a second printing unit 60 to be described later, and one end of a member that supports a second maintenance unit 75 to be described later are engaged with the rotational shaft 40*a*.

The recording medium 5 is also wound around the second drum 40 according to this preferred embodiment at the winding angle of 330 degrees similar to the above described first drum 30. The recording medium 5 applies normal force to the perimeter face of the second drum 40 with a tension at the beginning of winding made by the second drum 40, and that at the end of winding. As a result, the frictional force between the second drum 40 and the recording medium 5 increases, so that a slide does not occur between the second drum 40 and the recording medium 5, and the recording medium 5 is held in close contact with the second drum 40. The recording medium 5 held by the second drum 40 is conveyed with a driving force of a driving motor 41 that is linked to the rotational shaft 40*a* of the second drum 40 via a pulley and a belt. With this configuration, the second drum 40 on the downmost stream side functions as a driving drum.

Additionally, an encoder 42 of a position detecting unit is linked to the rotational shaft 40*a* of the second drum 40 via a coupling 43. The housing of the encoder 42 is fixed at one end of an encoder fixing member 44 having an L-shaped cross section, and the other end of the encoder fixing member 44 is fixed on the back side of the body frame 25. With this configuration, the rotational shaft of the encoder 42 rotates with the rotation of the second drum 40, and a detection pulse equivalent to the rotation of the second drum 40 is output. Then, the detection pulse output from the encoder 42 is input to a driving board, which is not shown and intended to drive the printing heads of the first and the second printing units 50 and 60, and the printing heads emit inks in synchronization with the detection pulse. Namely, the recording medium 5 is conveyed at the same speed without sliding on the first and the second drums 30 and 40. Therefore, an emission driving of the first and the second printing units 50 and 60 can be controlled based on the detection pulse output with the rotation of the second drum 40.

For example, a rotary encoder of 18,000 pulses per rotation is used as the encoder 42. Here, assume that the resolution of printing in the conveyance direction is 300 dpi, and the printing of 1 dot is made per pulse of the encoder 42. In this case, the diameter of the second drum 40 is 25.4 mm÷300 dpi× 18000 pulses÷pi=485 mm. Additionally, the diameter of the first drum 30 is assumed to be the same as that of the second drum 40 in this preferred embodiment. With this configuration, the printing heads of the first and the second printing units 50 and 60 emit inks in synchronization with the detection pulse of the encoder 42, and can execute a printing process of the resolution of 300 dpi in the conveyance direction.

The recording medium 5 is fed to the rewinder unit 4 via a free roller 22, a second dancer roller 23, and a free roller 24 after being wound around the second drum 40.

The second dancer roller 23 is supported to be rotatable at the tip of an arm 23*b* having its turn center 23*a* in the body frame 25. The self-weights of the second dancer roller 23 and the arm 23*b* configure a tension generating unit for applying a tension to the recording medium 5 that is wound around the second dancer roller 23.

Additionally, the tension generating unit also functions to remove looseness if the recording medium 5 gets loose due to fluctuations in the tension, which are caused by the lopsided core, etc. of the recording medium 5 that is held by the rewinder unit 4. Furthermore, a potention meter 23*c* for detecting a rotational position when the second dancer roller 23 moves in the vertical direction is provided at the turn center 23*a*. The tension of the recording medium 5 is controlled by activating a powder clutch, which is linked to the paper core fixing shaft 11 of the rewinder unit 4, in accordance with the output signal of the potention meter 23*c*. Also the free rollers 22 and 24 are supported by the body frame 25 to be rotatable.

The rewinder unit 4 is described next.

This rewinder unit 4 comprises a stand 10, and the paper core fixing shaft 11. The rewinder unit 4 is a rewinding unit that holds the rewound recording medium 5 to be rotatable, and rewinds the recording medium 5 from the printer unit 3.

The stand 10 supports the paper core fixing shaft 11 to be rotatable, and holds the rewound recording medium 5 with the paper core fixing shaft 11. Also for the paper core fixing shaft 11, air is injected into an air inlet similar to the paper core fixing shaft 7, so that a plurality of nails are made to protrude in a radius direction, and to bite into the inner diameter of the paper core of the rewound recording medium 5, which is thus held.

A driving motor 12 for rewinding is linked to the paper core fixing shaft 11 via a pulley and a belt. A driving force of the driving motor 12 is transferred to the paper core fixing shaft 11, and the recording medium 5 is rewound in the direction of an arrow 13. Additionally, a powder clutch not shown is arranged between the pulley and the driving motor 12 for rewinding. The powder clutch functions to adjust a tension in the conveyance direction of the recording medium 5.

The first and the second printing units 50 and 60 are described next. As shown in FIGS. 1 to 3, the first and the second printing units 50 and 60 are ink emitting devices for emitting inks to the recording medium 5.

The first printing unit 50 in this preferred embodiment comprises printing heads 51*a*, 51*b*, 51*c* and 51*d* of the total of 4 colors such as cyan (C), black (K), magenta (M), and yellow (Y). The printing heads 51*a*, 51*b*, 51*c* and 51*d* are arranged and fixed zigzag respectively on head holding plates 52*a*, 52*b*, 52*c* and 52*d* to be equal to or larger than the width of the recording medium 5. Nozzle surfaces formed on the printing heads 51*a*, 51*b*, 51*c* and 51*d* are arranged as opposed to the printing surface of the recording medium 5 that is held on the perimeter face of the first drum 30. Additionally, the relative positions of the printing heads 51*a*, 51*b*, 51*c* and 51*d* to the first drum 30 are aligned by the head holding plates 52*a*, 52*b*, 52*c* and 52*d* and the head holding member 53, and the head holding member 53 is engaged with the rotational shaft 30*a*.

The above described configuration of the first printing unit 50 is similar to that of the second printing unit 60.

The first and the second maintenance units 70 and 75 are described next. The first and the second maintenance units 70 and 75 have a function to perform maintenance operations such as wiping, nozzle suction, etc. in order to prevent the nozzles of the printing heads from clogging.

The first maintenance unit 70 comprises a plurality of suction nozzles 71, which correspond to the printing heads 51*a*, 51*b*, 51*c* and 51*d* of the first printing unit 50, 4 first ink pans 72, which correspond to the printing heads 51*a*, 51*b*, 51*c* and 51*d*, a second ink pan 73, which is formed with a metal plate, etc. so that 4 first ink pans 72 are covered, and integrated into one body with the 4 first ink pans 72, and a maintenance unit holding member 74 for holding the second ink pans 73.

The suction nozzles 71 suck inks from the printing heads 51*a*, 51*b*, 51*c* and 51*d*, and purge ink, paper dust, etc., which are adhered to the nozzle surfaces of the printing heads 51*a*, 51*b*, 51*c* and 51*d*. The first ink pans 72 collect inks purged at the time of maintenance operations. The maintenance unit holding member 74 is engaged with the rotational shaft 30*a* of the first drum 30 in order to align and hold the above described constituent elements (the suction nozzles 71, the first ink pans 72 and the second ink pan 73) with reference to the first drum 30.

For the maintenance operations, the printing heads 51*a*, 51*b*, 51*c* and 51*d* of the first printing unit 50 are initially retracted. Thereafter, the first maintenance unit 70 is moved immediately below the printing heads 51*a*, 51*b*, 51*c* and 51*d*, which then purge inks. The inks that flow out at the time of purging are collected by the 4 first ink pans 72, which respectively correspond to the printing heads 51*a*, 51*b*, 51*c* and 51*d*, into a liquid waste tank not shown. Then, the suction nozzles 71 that touch the nozzle surfaces of the printing heads 51*a*, 51*b*, 51*c* and 51*d* are scanned in the direction of a nozzle row, and inks remaining on the nozzle surfaces are sucked while inks, paper dust, etc., which are adhered to the nozzle surfaces, are scraped off with the suction nozzles 71.

Figure 3:
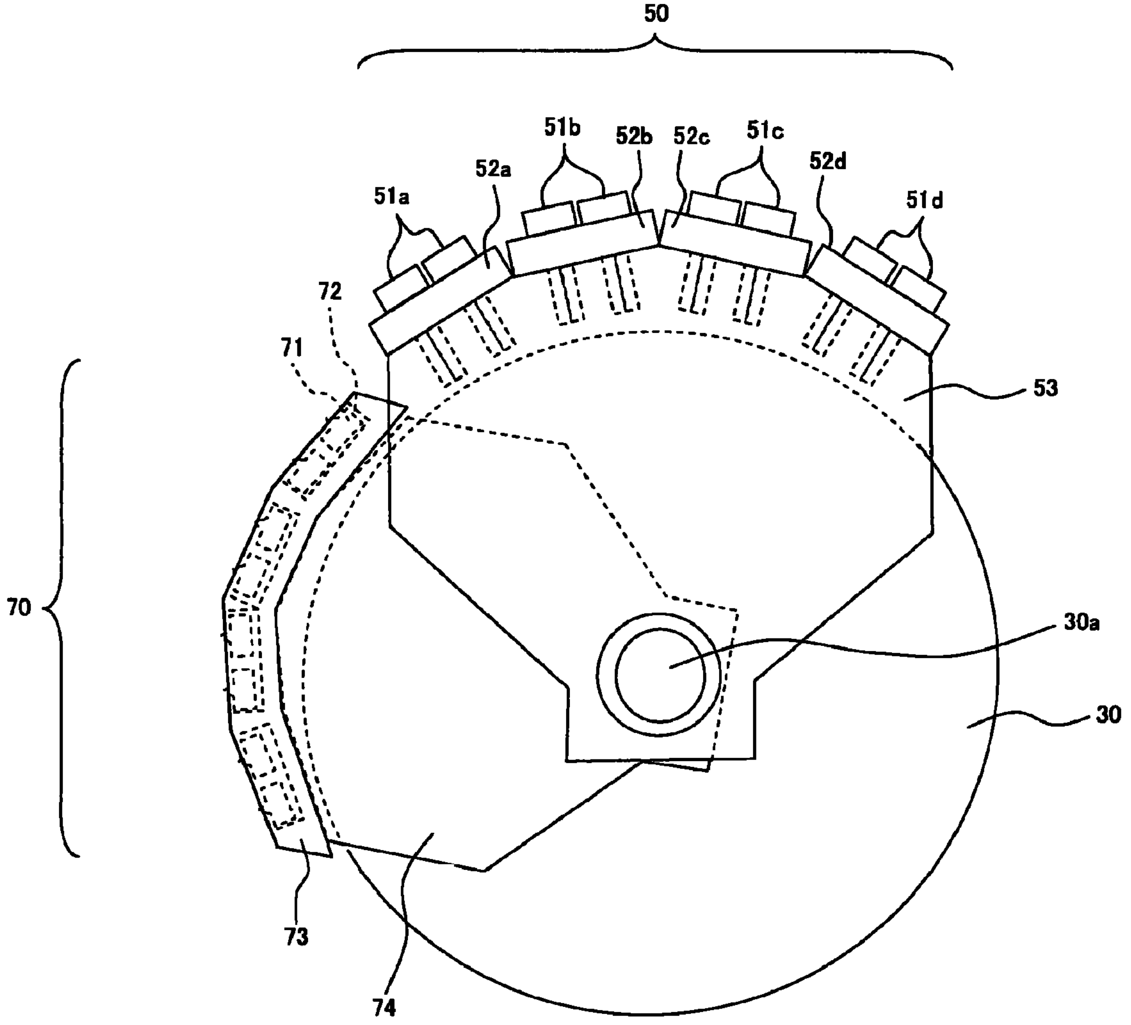
FIG. 3 is a schematic front view showing a first maintenance unit and a first printing unit 50 arranged as opposed to a first drum.

Upon termination of the maintenance operations, the first maintenance unit 70 returns, for example, to a standby position shown in FIG. 3. Since the first maintenance unit 70 is on standby in a slanted position at this time, the inks remaining in the first ink pans 72 can possibly drip. Therefore, the second ink pan 73 is provided. The end of the second ink pan 73 is formed with a wall having an acute bending angle, and is slanted toward the innermost direction of the apparatus, so that the inks accumulate in the second ink pan 73 even if the inks drip from the first ink pans 72. The inks collected in the second ink pan 73 flow into the liquid waste tank. With this configuration, the recording medium 5, the first drum, etc. within the apparatus are prevented from being contaminated with the ink.

The above described configuration of the first maintenance unit 70 is similar to that of the second maintenance unit 75.

Here, the maintenance operations by the first and the second maintenance units 70 and 75 are normally performed at predetermined time intervals or every predetermined number of printed sheets after the printing is started. However, the throughput can be improved by performing the maintenance operations at the following timings.

The maintenance operations are performed, for example, when the printing is suspended due to the feeding of the recording medium 5 unwound from the unwinder unit 2. As a result, the length of time for the maintenance of the printing heads, and the length of time for feeding the recording medium 5 can be made to overlap, whereby the throughput can be improved.

Additionally, the maintenance operations are performed, for example, when the printing is suspended due to the lack of ink supplied to the printing head. As a result, the length of time for the maintenance of the printing heads, and the length of time for resolving the lack of ink can be made to overlap, whereby the throughput can be improved.

Furthermore, the maintenance operations are performed, for example, while the recording medium is conveyed in the reverse direction due to the detection of improper printing, which is made by a detecting unit that is not shown and intended to detect improper printing, or while a slowdown operation is performed to stop the conveyance of the recording medium 5. As a result, the length of time for the maintenance of the printing heads, and the length of time for rewinding the recording medium or the length of time for the slowdown can be made to overlap, whereby the throughput can be improved.

The conveyance operation of the recording medium 5, which characterizes this preferred embodiment, is described next. In this preferred embodiment, an operation for applying a tension to the recording medium 5 is performed prior to the start of the conveyance operation of the recording medium 5.

Initially, the tension at the beginning of rewinding of the recording medium 5 is controlled by activating the powder clutch, which is linked to the paper core fixing shaft 7, in accordance with the output signal of the potention meter 16*c* so that the first dancer roller 16 is placed in a neutral position (the arm 16*b* becomes almost horizontal). As a result, the tension of approximately one half of the self-weights of the first dancer roller 16 and the arm 16*b* is applied to the recording medium 5 in the upstream of the conveyance path of the recording medium 5, namely, from the first dancer roller 16 to the beginning of winding of the first drum 30.

Also for the second dancer roller 23, the tension of the recording medium 5 is controlled by activating the powder clutch, which is linked to the paper core fixing shaft 11, in accordance with the output signal of the potention meter 23*c* so that the second dancer roller 23 is placed in a neutral position (the arm 23*b* becomes almost horizontal). As a result, the tension of approximately one half of the self-weights of the second dancer roller 23 and the arm 23*b* is applied to the recording medium 5 in the downstream of the conveyance path of the recording medium 5, namely, from the end of winding of the second drum 40 to the second dancer roller 23.

At this time, the recording medium 5 applies normal force to the perimeter face of the first drum 30 by the tension at the beginning of winding of the first drum 30 and that at the end of winding. As a result, the frictional force between the first drum 30 and the recording medium 5 increases, and the recording medium 5 is held in close contact with the first drum 30. Similarly, the recording medium 5 applies normal force to the perimeter face of the second drum 40 by the tension at the beginning of winding of the second drum 40 and that at the end of winding. As a result, the recording medium 5 is held in close contact with the second drum 40 by the frictional force between the second drum 40 and the recording medium 5.

Next when the conveyance operation of the recording medium 5 is started, the driving motor 41, the driving motor 8, and the driving motor 12 are driven, so that also the first drum 30 is driven to rotate, and the recording medium is conveyed. At this time, the recording medium 5 is conveyed without the occurrence of a slide between the perimeter faces of the first and the second drums 30 and 40 and the recording medium 5. Namely, the second drum 40, which is provided on the downmost stream side, is used as the driving drum, and the first drum 30 is used as the driven drum, whereby the recording medium 5 can be conveyed at the same speed without causing a speed difference between the first and the second drums 30 and 40. As a result, an image recorded on the recording medium 5 is not rubbed on the first and the second drums 30 and 40, and also paper dust, etc. can be prevented from occurring. Namely, since the recording medium 5 is conveyed by being held in close contact without sliding on the surfaces of the drums, the quality of printing can be prevented from being degraded. Additionally, since paper dust from the recording medium 5 can be prevented from occurring, the occurrence of non-emission of inks is reduced, and the quality of printing can be further prevented from being degraded.

Note that the operation for applying a tension to the recording medium 5 may be performed the same time the conveyance operation is started.

The printing operation on the recording medium 5 in this preferred embodiment is described next.

Once the printing operation is started, the above described tension generation operation and conveyance operation of the recording medium 5 get started, and the detection pulse equivalent to the rotation of the second drum 40 is output from the encoder 42 that is linked to the rotational shaft 40*a* of the second drum 40. The printing heads of the first printing unit 50 are initially driven based on the detection pulse, and the printing process on the recording medium 5 is executed by the first printing unit 50.

Next, a surface of the recording medium 5, which is reverse to the surface printed by the first printing unit 50, is printed by the second printing unit 60, so that double-sided printing is made. Here, the recording medium 5 does not slide on the first and the second drums 30 and 40, which rotate at the same speed and convey the recording medium 5. Accordingly, for example, the length of the conveyance path from the printing position, on the recording medium 5, of the printing head for cyan (C) of the first printing unit 50 to the printing position, on the recording medium 5, of the printing head for cyan (C), of the second printing unit 60 is converted into the number of pulses detected by the encoder 42 beforehand, and the printing by the second printing unit 60 is started when the number of pulses detected by the encoder 42 reaches a predetermined number of pulses after the printing is made by the first printing unit 50. As a result, the printing surface of the recording medium 5, which is printed by the first printing unit 50, and that of the recording medium 5, which is printed by the second printing unit 60, can be made to match at the time of double-sided printing.

In this preferred embodiment, the encoder 42 is linked only to the second drum 40. However, the encoder 42 may be linked only to the first drum 30 since the first and the second drums 30 and 40 rotate at the same speed without making the recording medium 5 slide, and convey the recording medium 5.

With this configuration, the encoder is attached to any one of the drums, whereby the space within the apparatus can be reduced, and cost cutting can be made.

The arrangement of the first and the second drums 30 and 40 in this preferred embodiment is described next.

In this preferred embodiment, the rotational shaft 30*a* of the first drum 30, and the rotational shaft 40*a* of the second drum 40 are arranged to exist on the same axis in the vertical direction of the apparatus when viewed from the front. As a result, the winding angle of the recording medium 5 around the first and the second drums 30 and 40 can be easily secured.

Furthermore, the width of the apparatus is determined by the diameters (such as 485 mm) of the drums, and by space required to arrange the rollers as a result of arranging the first drum 30 and the second drum 40 in the vertical direction, leading to reductions in size.

For the arrangement of the first and the second drums 30 and 40 in the vertical direction, the rotational shaft 30*a* of the first drum 30 and the rotational shaft 40*a* of the second drum 40 are not always required to be arranged on the same axis in the vertical direction of the apparatus. The first and the second drums 30 and 40 may be arranged so that at least their portions overlap in the vertical direction.

A second preferred embodiment according to the present invention is described next with reference to FIGS. 4 and 5.

In the description of the image recording apparatus according to the second preferred embodiment of the present invention, the same constituent elements as those of the above described first preferred embodiment are denoted with the same reference numerals, and explanations about their configurations are omitted.

Figure 4:
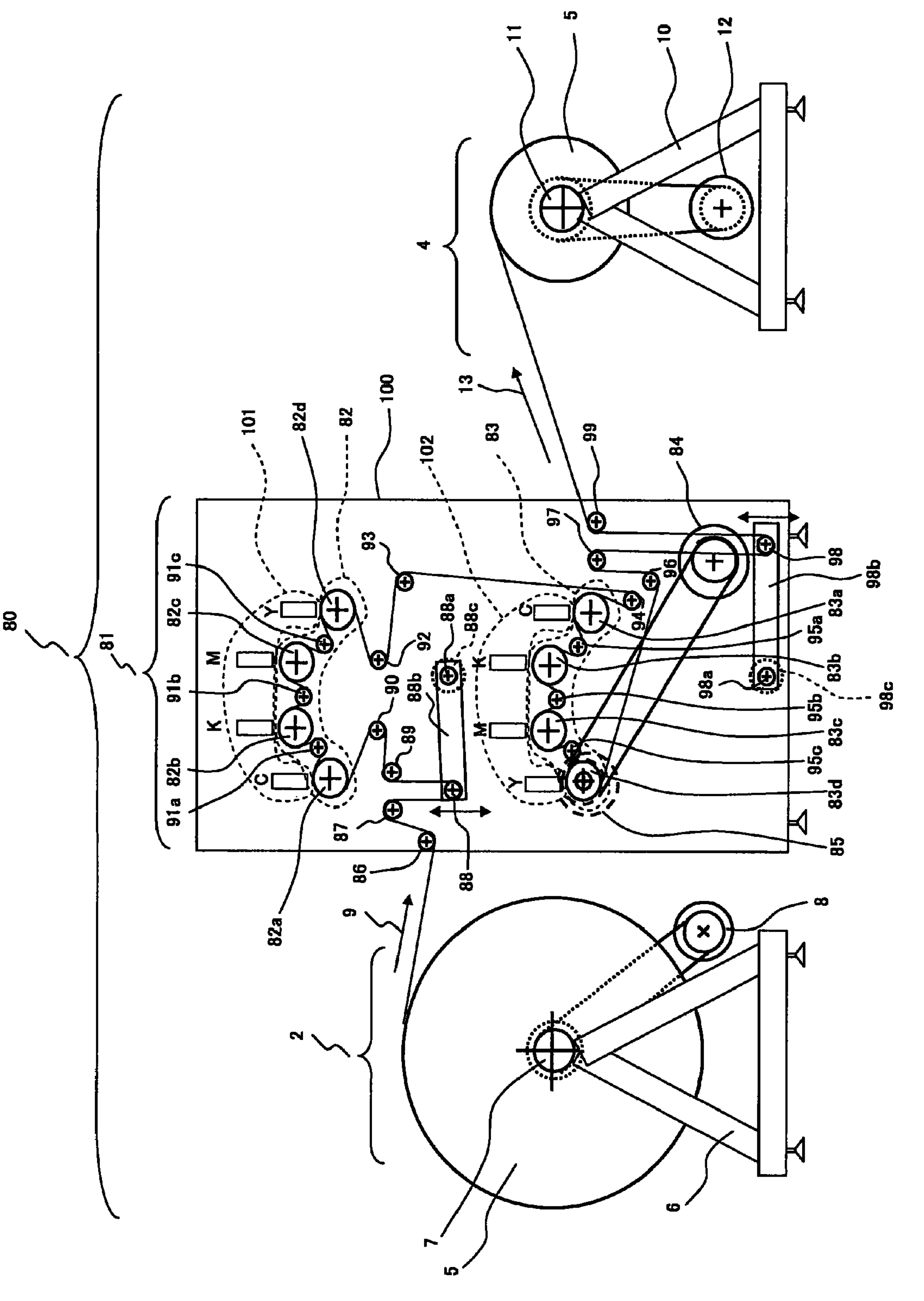
FIG. 4 is a schematic front view showing a conveying system of a recording medium in an image recording apparatus according to a second preferred embodiment.
Figure 5:
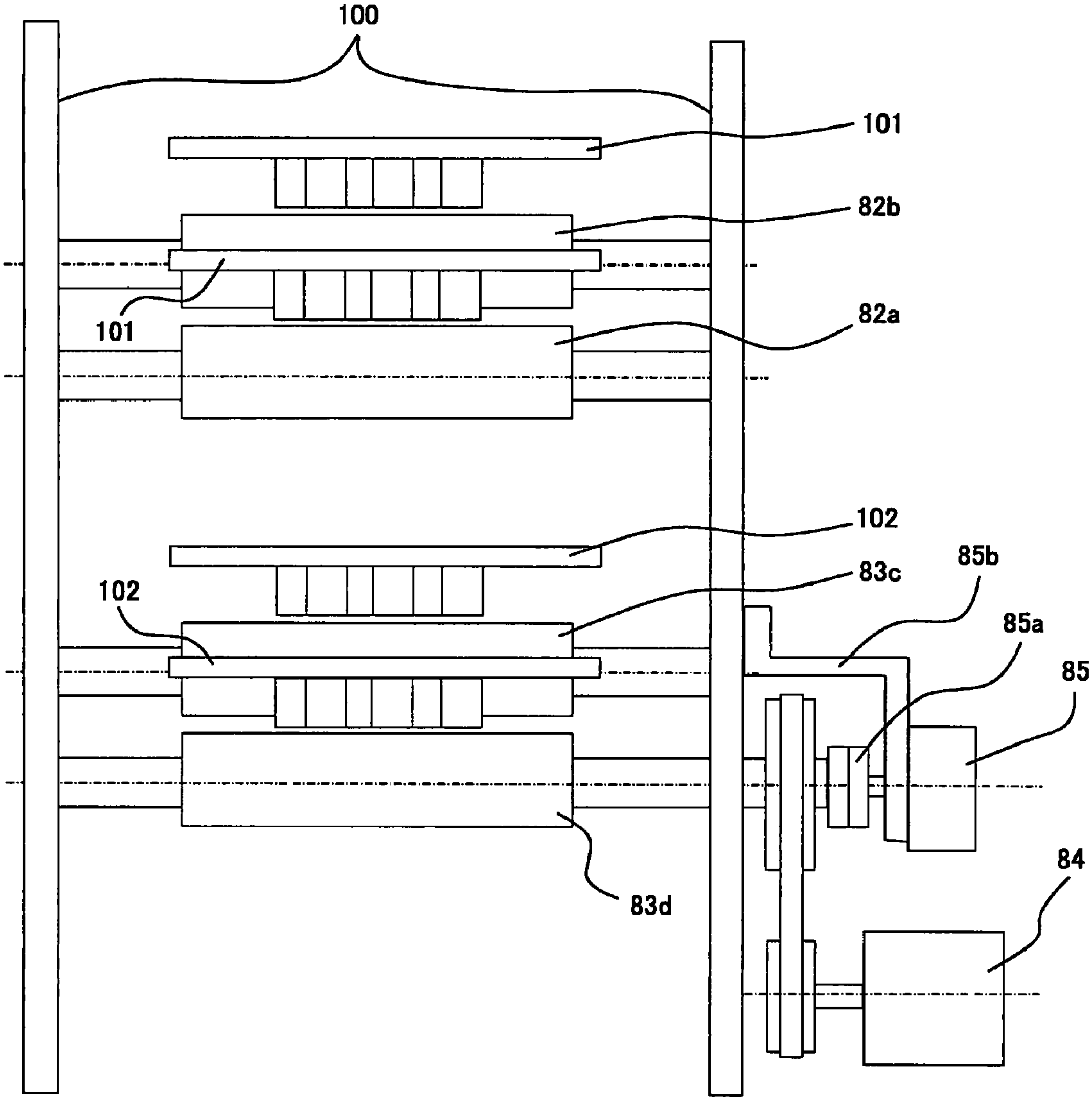
FIG. 5 is a schematic side view showing a printer unit of the image recording apparatus according to the second preferred embodiment.

FIG. 4 is a schematic front view showing the conveying system of the recording medium 5 in the image recording apparatus 80 according to this preferred embodiment, whereas FIG. 5 is a schematic side view showing a printer unit 81 of the image recording apparatus 80 according to this preferred embodiment.

The image recording apparatus 80 according to this preferred embodiment comprises an unwinder unit 2, the printer unit 81, and a rewinder unit 4. Since the unwinder unit 2 and the rewinder unit 4 have configurations similar to those in the above described first preferred embodiment, their detailed explanations are omitted.

The printer unit 81 is described first. The printer unit 81 loads the recording medium 5 conveyed from the unwinder unit 2, and holds the recording medium by winding the medium around a first drum unit 82. Then, the recording medium 5 is conveyed immediately below a first printing unit 101 that is arranged as opposed to the first drum unit 82, and printing is made on the surface of the recording medium 5. The recording medium 5 is held by being wound around a second drum unit 83 after its surface is printed. Then, the recording medium 5 is conveyed immediately below a second printing unit 102 that is arranged as opposed to the second drum unit 83, printing is made on the back surface of the recording medium 5, and the recording medium 5 is fed to the rewinder unit 4.

This printer unit 81 is configured with a conveying unit of the recording medium 5, which is composed of a plurality of rollers, the first drum unit 82 and the second drum unit 83, a body frame 100, the first printing unit 101 and the second printing unit 102.

The conveying unit of the recording medium 5 is described first. The recording medium 5 unwound from the unwinder unit 2 is conveyed to the first drum unit 82 via free rollers 86 and 87, a first dancer roller 88, and free rollers 89 and 90.

The first dancer roller 88 is held to be rotatable at the tip of an arm 88*b* having a turn center 88*a* in the body frame 100 in a similar manner as in the first preferred embodiment. The self-weights of the first dancer roller 88 and the arm 88*b* configure a tension generating unit for applying a tension to the recording medium 5 that is wound around the first dancer roller 88. Additionally, the tension generating unit also functions to remove looseness if the recording medium 5 gets loose due to fluctuations in the tension, which are caused by the lopsided core, etc. of the recording medium 5 that is held by the unwinder unit 2. Furthermore, a potention meter 88*c* for detecting a rotational position when the first dancer roller 88 moves in the vertical direction is provided at the turn center 88*a*. The tension of the recording medium 5 is controlled by activating a powder clutch, which is linked to a paper core fixing shaft 7 of the unwinder unit 2, in accordance with the output signal of the potention meter 88*c*. The free rollers 86, 87, 89, 90 are supported by the body frame 100 to be rotatable.

A configuration of the first drum unit 82 is described next. The first drum unit 82 is configured with first drums 82*a*, 82*b*, 82*c* and 82*d*, which are arranged as opposed to the printing heads of 4 colors, and free rollers 91*a*, 91*b* and 91*c*, which are arranged in between the first drums 82*a*, 82*b*, 82*c* and 82*d* so that the winding angle of the recoding medium 5 around each drum is equal to or larger than approximately 180 degrees. Additionally, the drums and the free rollers are hollow cylinders made of aluminum respectively, and their rotational shafts are supported by the body frame 100 to be rotatable.

The first drums 82*a*, 82*b*, 82*c* and 82*d* are arranged in the shape of a sector in order to reduce the width dimension of the printer unit 81. The recording medium 5 applies normal force to a perimeter face by the tension at the beginning of winding and that at the end of winding in each of the first drums 82*a*, 82*b*, 82*c* and 82*d*. As a result, the frictional force between each of the first drums 82*a*, 82*b*, 82*c* and 82*d* and the recording medium 5 increases, and the recording medium 5 is held in close contact with the first drums 82*a*, 82*b*, 82*c* and 82*d*.

Namely, the recording medium 5 is configured not to slide on the first drums 82*a*, 82*b*, 82*c* and 82*d*.

As a result, the first drums 82*a*, 82*b*, 82*c* and 82*d* serve as rotating drums driven by the second drum unit 83 via the recording medium 5.

The recording medium 5 is conveyed to the second drum unit 83 via free rollers 92, 93 and 94 after being wound around the first drum unit 82. Also the free rollers 92, 93 and 94 are supported by the body frame 100 to be rotatable.

A configuration of the second drum unit 83 is described next. Also the second drum unit 83 is configured with second drums 83*a*, 83*b*, 83*c* and 83*d*, which are arranged as opposed to the printing heads of 4 colors, and free rollers 95*a*, 95*b* and 95*c*, which are arranged in between the second drums 83*a*, 83*b*, 83*c* and 83*d* so that the winding angle of the recording medium 5 around the drum is approximately 180 degrees or more, similar to the first drum unit 82.

Additionally, the drums and the free rollers are hollow cylinders made of aluminum respectively, and their rotational shafts are supported by the body frame 100 to be rotatable. The second drums 83*a*, 83*b*, 83*c* and 83*d* are arranged in the shape of a sector in order to reduce the width dimension of the printer unit 81. The recording medium 5 applies normal force to a perimeter faces by the tension at the beginning of winding and that at the end of winding in each of the second drums 83*a*, 83*b*, 83*c* and 83*d*. As a result, a frictional force between each of the second drums 83*a*, 83*b*, 83*c* and 83*d* and the recording medium 5 increases, and the recording medium 5 is held in close contact with the second drums 83*a*, 83*b*, 83*c* and 83*d*. Namely, the recording medium 5 is configured not to slide on the second drums 83*a*, 83*b*, 83*c* and 83*d*. The recording medium 5 is conveyed with the driving force of a driving motor 84 that is linked to the rotational shaft of the second drum 83*d* via a pulley and a belt. With this configuration, the second drum 83*d* on the downmost stream side serves as a driving drum, whereas the second drums 83*a*, 83*b* and 83*c* serve as driven drums.

Additionally, an encoder 85 is linked to the rotational shaft of the second drum 83*d* via a coupling 85*a*. The housing of the encoder 85 is fixed at one end of an encoder fixing member 85*b* having an L-shaped cross section, and the other end of the encoder fixing member 85*b* is fixed on the back side of the body frame 100. With this configuration, the rotational shaft of the encoder 85 rotates with the rotation of the second drum 83*d*, and a detection pulse equivalent to the rotational of the second drum 83*d* is output. This detection pulse is input to a driving board, which is not shown and intended to drive the printing heads of the first and the second printing units 101 and 102, and the printing heads emit inks. Namely, the recording medium 5 is conveyed at the same speed without sliding on the first and the second drums 82 and 83. Therefore, an emission driving of the printing heads of the first and the second printing units 101 and 102 can be controlled based on the detection pulse output with the rotation of the second drum 83*d*. The encoder 85 is set to print 1 dot per pulse in a similar manner as in the above described first preferred embodiment, and the diameter of the second drum 83*d* is determined based on the resolution (300 dpi) of the printing in the conveyance direction and the number of pulses of the encoder 85. Additionally, the diameters of the first drums 82*a*, 82*b*, 82*c* and 82*d*, and the second drums 83*a*, 83*b* and 83*c* are made identical to that of the second drum 83*d* in this preferred embodiment. With this configuration, the recording medium 5 is conveyed at the same speed on the first and the second drum units 82 and 83 without a slide. Therefore, the length of the conveyance path is converted into the number of pulses detected by the encoder 84 beforehand, and the printing by the second printing unit 102 is started when the number of pulses detected by the encoder 84 reaches a predetermined number of pulses after the printing is made by the first printing unit 101, whereby recording positions on the front and the back sides of the recording medium 5 can be made to match.

The recording medium 5 is fed to the rewinder unit 4 via free rollers 96 and 97, a second dancer roller 98, and a free roller 99 after being wound around the second drum unit 83.

The second dancer roller 98 is held to be rotatable at the tip of an arm 98*b* having a turn center 98*a* in the body frame 100 in a similar manner as in the first preferred embodiment. The self-weights of the second dancer roller 98 and the arm 98*b* configure a tension generating unit for applying a tension to the recording medium 5 that is wound around the second dancer roller 98. The tension generating unit also functions to remove looseness if the recording medium 5 gets loose due to fluctuations in the tension, which are caused by the lopsided core, etc. of the recording medium 5 that is held by the rewinder unit 4. Furthermore, a potention meter 98*c* for detecting a rotational position when the second dancer roller 98 moves in the vertical direction is provided at the turn center 98*a*. The tension of the recording medium 5 is controlled by activating a powder clutch, which is linked to the paper core fixing shaft 11 of the rewinder unit 4, in accordance with the output signal of the potention meter 98*c*.

The first and the second printing units 101 and 102 are described next. As shown in FIGS. 4 and 5, the first and the second printing units 101 and 102 are ink emitting devices for emitting inks to the recording medium 5.

The first and the second printing units 101 and 102 comprise the printing heads of the total of 4 colors such as cyan (C), black (K), magenta (M), and yellow (Y). In a similar manner as in the above described first preferred embodiment, the printing heads are arranged and fixed zigzag respectively on head holding plates. Nozzle surfaces formed on the printing heads are arranged as opposed to the printing face of the recording medium 5 that is held on the perimeter faces of the first drums 82*a*, 82*b*, 82*c* and 82*d*, and the second drums 83*a*, 83*b*, 83*c* and 83*d*, and the ink emission directions of all of the printing heads match the vertical direction of the apparatus. The ink emission directions of all of the printing heads are made uniform as described above, thereby preventing a change in the characteristics, which is caused by a difference among the postures of the printing heads attached.

The conveyance operation of the recording medium 5, which characterizes this preferred embodiment, is described next.

Once the conveyance operation of the recording medium 5 is started, the operation for applying a tension to the recording medium 5 is initially performed in this preferred embodiment. The tension of the recording medium 5 is controlled by activating the powder clutch, which is linked to the paper core fixing shaft 7, in accordance with the output signal of the potention meter 88*c* so that the first dancer roller 88 is placed in a neutral position. As a result, the tension of approximately one half of the self-weights of the first dancer roller 88 and the arm 88*b* is applied to the recording medium 5 in the upstream of the conveyance path of the recording medium 5, namely, from the first dancer roller 88 to the beginning of winding of the first drum 82*a*.

Additionally, the tension of the recording medium 5 is controlled by activating the powder clutch, which is linked to a paper core fixing shaft 11, in accordance with the output signal of the potention meter 98*c* so that the second dancer roller 98 is placed in a neutral position. As a result, the tension of approximately one half of the self-weights of the second dancer roller 98 and the arm 98*b* is applied to the recording medium 5 in the downstream of the conveyance path of the recording medium 5, namely, from the end of winding of the second drum 83*d* to the second dancer roller 98.

At this time, the recording medium 5 applies normal force to the perimeter faces of the first drums 82*a*, 82*b*, 82*c* and 82*d* by the tension at the beginning of winding of the first drums 82*a*, 82*b*, 82*c* and 82*d* and that at the end of winding. As a result, a frictional force between each of the first drums 82*a*, 82*b*, 82*c* and 82*d* and the recording medium 5 increases, and the recording medium 5 is held in close contact with the first drums 82*a*, 82*b*, 82*c* and 82*d*.

Similarly, the recording medium 5 applies normal force to the perimeter faces of the second drums 83*a*, 83*b*, 83*c* and 83*d* by the tension at the beginning of winding of the second drums 83*a*, 83*b*, 83*c* and 83*d* and that at the end of winding. As a result, a frictional force between each of the second drums 83*a*, 83*b*, 83*c* and 83*d* and the recording medium 5 increases, and the recording medium 5 is held in close contact with the second drums 83*a*, 83*b*, 83*c* and 83*d*.

Next, a driving motor 84, the driving motor 8 and the driving motor 12 are driven, so that also the first drums 82*a*, 82*b*, 82*c* and 82*d*, and the second drums 83*a*, 83*b* and 83*c* are driven to rotate, and the recording medium is conveyed. At this time, the recording medium 5 is conveyed without the occurrence of a slide between the perimeter faces of the first drums 82*a*, 82*b*, 82*c*, 82*d* and the second drums 83*a*, 83*b*, 83*c*, 83*d*, and the recording medium 5. Namely, the second drum 83*d*, which is provided on the downmost stream side, is used as the driving drum, and the first drums 82*a*, 82*b*, 82*c* and 82*d*, and the second drums 83*a*, 83*b* and 83*c* are used as driven drums, whereby the recording medium 5 can be conveyed at the same speed without causing a speed difference between the second drum 83*d*, and the first drums 82*a*, 82*b*, 82*c*, 82*d* and the second drums 83*a*, 83*b*, 83*c*.

As a result, an image recorded on the recording medium 5 is not rubbed on the first and the second drum units 82 and 83, and also paper dust, etc. can be prevented from occurring. Namely, since the recording medium 5 is conveyed by being held in close contact without sliding on the surfaces of the drums, inks adhered to the surfaces of the conveying rollers, or the reprinting of a printed image on the recording medium is reduced. As a result, the quality of printing can be prevented from being degraded. Additionally, because paper dust from the recording medium can be prevented from occurring, the occurrence of non-emission of inks is reduced, and the quality of printing can be further prevented from being degraded. In this preferred embodiment, the encoder 8 is linked only to the second drum 83*d*. However, the encoder 85 may be linked to any one of the other drums.

What is claimed is:

1. An image recording apparatus comprising:
- a first drum which is rotatable, and which holds a continuous recording medium on a perimeter face thereof;
- a first printing unit, which is arranged to oppose the first drum, and which performs image recording on a first face of the recording medium;
- a second drum which is rotatable, and which holds the first face of the recording medium on a perimeter face thereof, wherein the second drum is provided downstream of the first drum with respect to a conveyance path of the recording medium;
- a second printing unit which is arranged to oppose the second drum, and which performs image recording on a second face of the recording medium;
- a driving source which drives the second drum to rotate so that the second drum acts as a driving drum which conveys the recording medium and the first drum acts as a driven drum which is rotated by conveyance of the recording medium; and
- a tension generating unit which attaches the recording medium to the first and second drums,
- wherein the tension generating unit is arranged on an upstream side of the first drum and a downstream side of the second drum in the conveyance path of the recording medium.

2. The image recording apparatus according to claim 1, wherein a position detecting unit is provided in one of the the first drum and the second drum, and detects a rotational position of said one of the first drum and the second drum, and wherein the first printing unit and the second printing unit are controlled based on a signal of the position detected by the position detecting unit.

3. The image recording apparatus according to claim 1, wherein the first drum and the second drum are arranged in a vertical direction.

4. The image recording apparatus according to claim 3, wherein the first drum and the second drum are arranged so that at least portions thereof overlap in the vertical direction.

5. The image recording apparatus according to claim 1, wherein a winding angle of the recording medium around the first drum and the second drum is at least 180 degrees.

6. The image recording apparatus according to claim 1, wherein the first printing unit and the second printing unit comprise inkjet heads for emitting inks, and wherein the inkjet heads are arranged to be equal to or larger than a width of the recording medium in a direction orthogonal to a conveyance direction of the recording medium.

7. The image recording apparatus according to claim 1, wherein the recording medium comprises roll paper.

8. The image recording apparatus according to claim 1, wherein the tension generating unit comprises a dancer roller.

* * * * *